United States Patent
Hillis et al.

(10) Patent No.: US 7,231,097 B2
(45) Date of Patent: Jun. 12, 2007

(54) LENS DEFECT CORRECTION

(75) Inventors: W. Daniel Hillis, Encino, CA (US); Nathan P. Myhrvold, West Medina, WA (US); Lowell L. Wood, Jr., Livermore, CA (US)

(73) Assignee: Searete, LLC, Bellevue, WA (US)

( * ) Notice: Subject to any disclaimer, the term of this patent is extended or adjusted under 35 U.S.C. 154(b) by 490 days.

(21) Appl. No.: 10/738,626

(22) Filed: Dec. 16, 2003

(65) Prior Publication Data
US 2005/0129327 A1 Jun. 16, 2005

(51) Int. Cl.
G06K 9/36 (2006.01)
G06K 9/40 (2006.01)
G03B 13/00 (2006.01)
H04N 5/232 (2006.01)

(52) U.S. Cl. .................. 382/255; 382/284; 382/345

(58) Field of Classification Search ............. 382/173, 382/255, 280, 284, 294, 312; 348/345, 357; 358/450; 359/696
See application file for complete search history.

(56) References Cited

U.S. PATENT DOCUMENTS

| 4,141,032 | A | * | 2/1979 | Haeusler | 348/44 |
|---|---|---|---|---|---|
| 4,275,949 | A | * | 6/1981 | Jones | 359/209 |
| 4,584,704 | A | * | 4/1986 | Ferren | 382/255 |
| 5,451,766 | A | | 9/1995 | Van Berkel | |
| 5,581,637 | A | * | 12/1996 | Cass et al. | 382/284 |
| 5,805,348 | A | * | 9/1998 | Estelle et al. | 359/677 |
| 6,088,083 | A | | 7/2000 | Meier | |
| 6,115,146 | A | * | 9/2000 | Suzuki et al. | 358/474 |
| 6,967,780 | B2 | * | 11/2005 | Hillis et al. | 359/619 |
| 7,012,757 | B2 | * | 3/2006 | Wallerstein et al. | 359/642 |
| 7,046,401 | B2 | * | 5/2006 | Dufaux et al. | 358/450 |
| 7,058,233 | B2 | * | 6/2006 | Silber | 382/256 |
| 2002/0114077 | A1 | * | 8/2002 | Javidi | 359/618 |
| 2002/0176011 | A1 | * | 11/2002 | Kuwayama | 348/239 |
| 2003/0071969 | A1 | | 4/2003 | Levine et al. | |
| 2003/0098352 | A1 | | 5/2003 | Schnee et al. | |
| 2005/0157394 | A1 | * | 7/2005 | Hillis et al. | 359/619 |
| 2006/0098861 | A1 | * | 5/2006 | See et al. | 382/145 |

FOREIGN PATENT DOCUMENTS

JP 11249027 A * 9/1999

OTHER PUBLICATIONS http://www.ece.sunysb.edu/~cvl/DFD/html; "Image Focus and Defocus Analysis for 3D Vision"; pp. 1-2; printed on Jan. 20, 2004.

(Continued)

*Primary Examiner*—Matthew C. Bella
*Assistant Examiner*—Yubin Hung

(57) ABSTRACT

Methods and systems related to: (a) capturing a primary image of a subject with a lens at a primary position, the lens having at least one deviation that exceeds a first tolerance for a target optical property; (b) capturing another image of the subject with the lens at another position, wherein said capturing another image with the lens at another position further includes moving at least a part of the lens to the other position within at least one distance constrained by the at least one deviation; (c) determining at least one out-of-focus region of the primary image; (d) determining a focus of at least one region of the other image relative to a focus of the at least one out-of-focus region of the primary image; and (e) constructing a composite image in response to the at least one region of the other image having a sharper focus relative to the focus of the at least one out-of-focus region of the primary image.

34 Claims, 5 Drawing Sheets

OTHER PUBLICATIONS

Ta Yuan, "Integration of Focus and Defocus Analysis with Color Stereo for Three-Dimensioal Shape Recovery"; Department of Electrical Engineering, State University of New York at Stony Brook; pp. 1-143; Dec. 1999.

PCT International Search Report; International App. No. PCT/US05/01513.

PCT International Search Report, International App. No. PCT/US04/41038, Sep. 6, 2006.

PCT International Search Report, International App. No. PCT/US05/00844, Aug. 8, 2006.

* cited by examiner

LENS DEFECT CORRECTION

TECHNICAL FIELD

The present application relates, in general, to imaging.

SUMMARY

In one embodiment, a method includes but is not limited to: capturing a primary image with a lens at a primary position, the lens having at least one deviation that exceeds a first tolerance from a target optical property; capturing another image with the lens at another position; determining at least one out-of-focus region of the primary image; determining a focus of at least one region of the other image relative to a focus of the at least one out-of-focus region of the primary image; and constructing a composite image in response to the at least one region of the other image having a sharper focus relative to the focus of the at least one out-of-focus region of the primary image. In addition to the foregoing, various other method embodiments are set forth and described in the text (e.g., claims and/or detailed description) and/or drawings of the present application.

In one or more various embodiments, related systems include but are not limited to electro-mechanical systems (e.g., motors, actuators, circuitry, and/or programming) for effecting the herein-referenced method embodiments; the electrical circuitry can be virtually any combination of hardware, software, and/or firmware configured to effect the foregoing-referenced method embodiments depending upon the design choices of the system designer.

In one embodiment, a system includes but is not limited to: a photo-detector array; a lens having at least one deviation that exceeds a first tolerance from a target optical property; a controller configured to position said lens at a primary and another position relative to said photo-detector array and to cause an image capture signal at the primary and the other position; and an image construction unit configured to construct at least one out-of-focus region of a first image captured at the primary position with a more in-focus region of another image captured at the other position.

In addition to the foregoing, various other method and or system embodiments are set forth and described in the text (e.g., claims and/or detailed description) and/or drawings of the present application.

The foregoing is a summary and thus contains, by necessity; simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE FIGURES

The use of the same symbols in different drawings typically indicates similar or identical items.

DETAILED DESCRIPTION OF THE FIGURES

Figure 1:
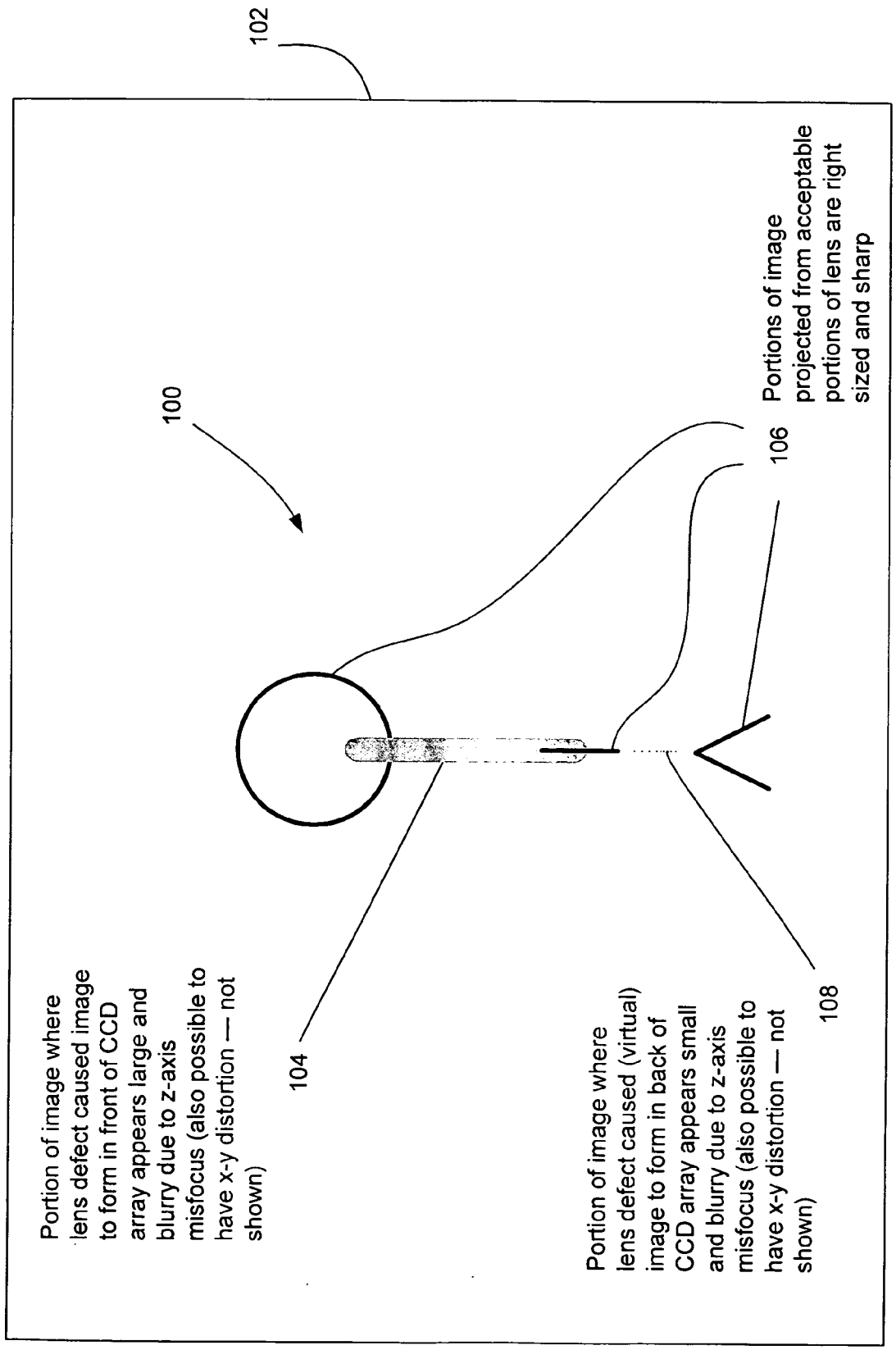
FIG. 1 shows a front-plan view of image 100 of a person (e.g., person 202 of FIG. 2) projected onto photo-detector array 102.

With reference to the figures, and with reference now to FIG. 1, shown is a front-plan view of image 100 of a person (e.g., person 202 of FIG. 2) projected onto photo-detector array 102. Image 100 is shown as distorted due to defects in a lens through which image 100 has been projected (e.g., lens 204 of lens system 200 of FIG. 2). First portion 104 of image 100 is illustrated as large and blurry, which can occur when a lens defect causes portion 104 of image 100 to come to a focus in front of a surface of photo-detector array 102. Second, third, and fourth portions 106 are illustrated as right sized, which can occur when the lens causes portions 106 of image 100 to correctly focus on an imaging surface of photo-detector array 102. Fifth portion 108 is shown as small and faint, which can occur when a lens defect causes portion 108 of image 100 to come to a focus (virtual) behind an imaging surface of photo-detector array 102. In addition, although not expressly shown, those having skill in the art will appreciate that various lens defects could also cause the image to be distorted in x-y; those having skill in the art will also appreciate that different colored wavelengths of light can in and of themselves focus at different positions due to differences in refraction of the different colored wavelengths of light.

Figure 2:
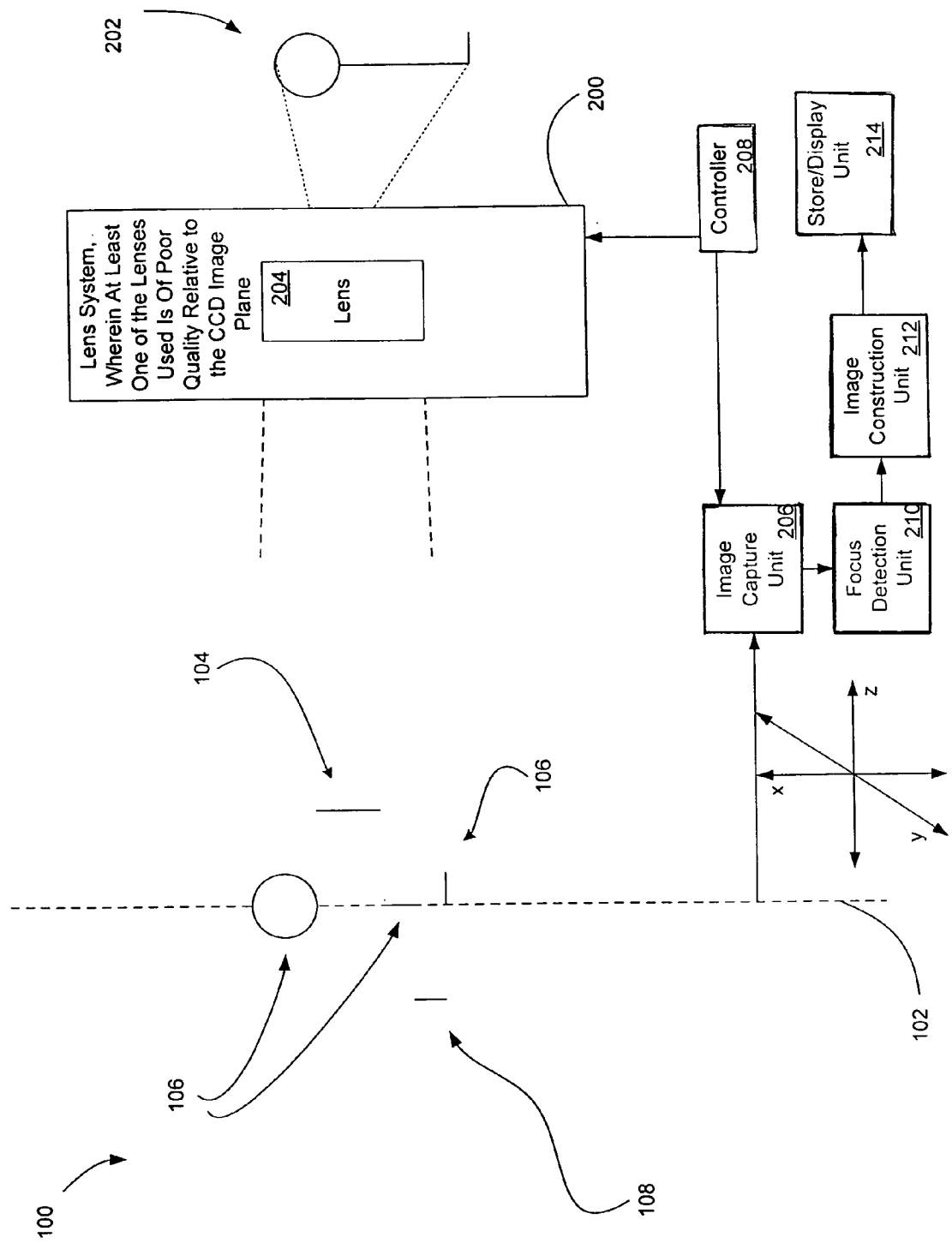
FIG. 2 depicts a side-plan view of lens system 200 that can give rise to image 100 of FIG. 1.

Referring now to FIG. 2, depicted is a side-plan view of lens system 200 that can give rise to image 100 of FIG. 1. Lens 204 of lens system 200 is illustrated as located at a primary position and having defects that give rise to the five different portions of image 100 shown and described in relation to FIG. 1. First portion 104 of image 100 is illustrated as focused in front of an imaging surface of photo-detector array 102. Second, third, and fourth portions 106 are illustrated as right sized and focused on an imaging surface of photo-detector array 102. (It is recognized that in side plan view the head and feet of person 202 would appear as lines; however, for sake of clarity they are shown in profile in FIG. 2 to help orient the reader relative to FIG. 1.) Fifth portion 108 is shown as small and faint, and virtually focused behind an imaging surface of photo-detector array 102.

Figure 3:
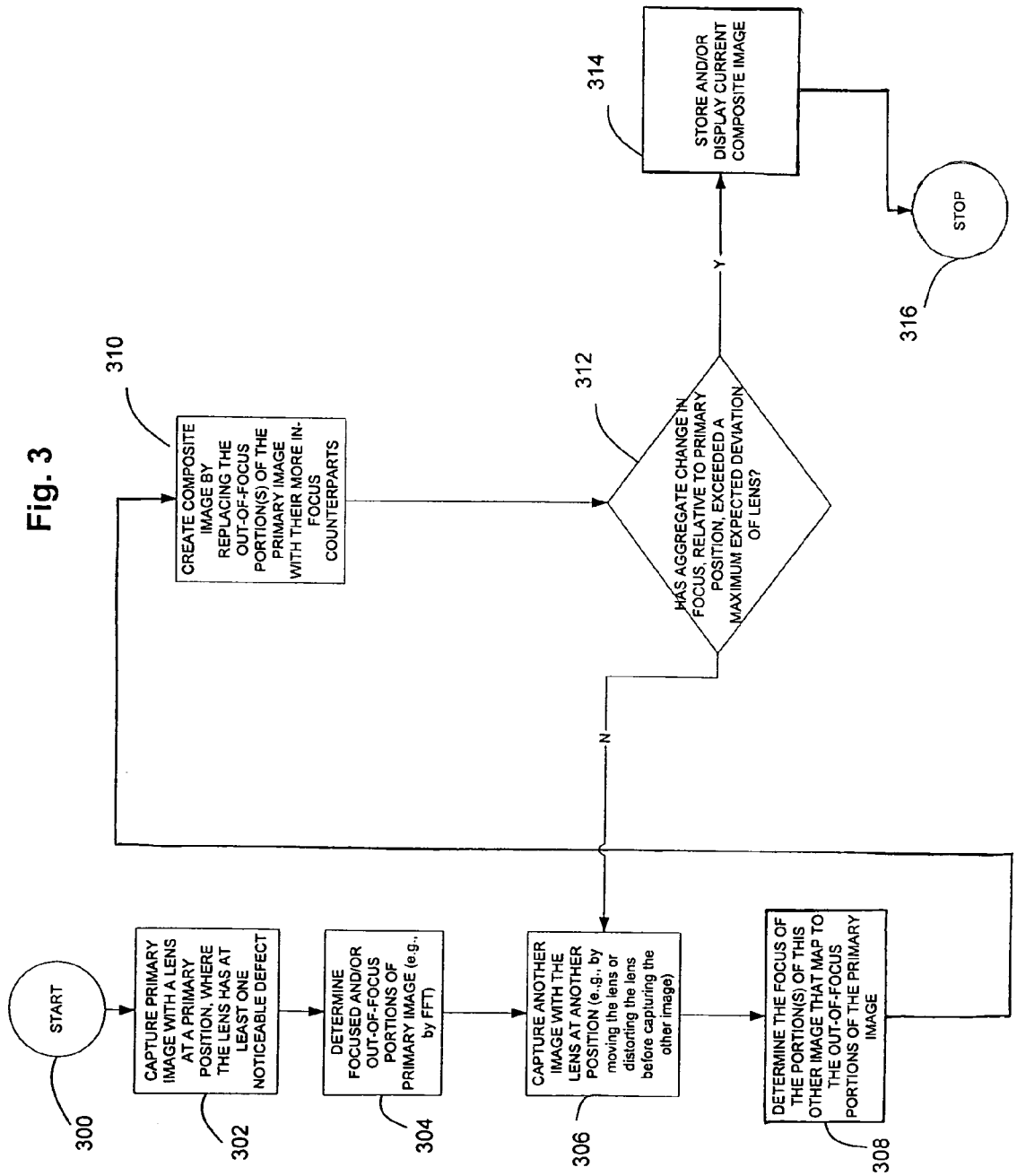
FIG. 3 depicts a high level logic flowchart of a process.

Continuing to refer to FIG. 2, further shown are components that can serve as the environment for the process shown and described in relation to FIG. 3. Specifically, controller 208 is depicted as controlling the position of lens 204 of lens system 200 (e.g., via use of a feedback control subsystem). Image capture unit 206 is illustrated as receiving image data from photo-detector 102 and receiving control signals from controller 208. Image capture unit 206 is shown as transmitting captured image information to focus detection unit 210. Focus detection unit 210 is depicted as transmitting focus data to image construction unit 212. Image construction unit 212 is illustrated as transmitting a composite image to image store/display unit 214.

With reference now to FIG. 3, depicted is a high level logic flowchart of a process. Method step 300 shows the start of the process. Method step 302 depicts capturing a primary image with a lens at a primary position, the lens having at least one deviation that exceeds a first tolerance from a target optical property. One example of the lens having at least one deviation that exceeds a first tolerance from a target optical property would be where the lens has at least one focal length that exceeds a first tolerance from a defined focal length (e.g., a defect that would produce portion 108 of image 100 at some place behind an imaging surface of photo-detector 102 or a defect that would produce portion 104 at some place in front of the imaging surface of photo-detector array 102 where the distance in front or back of the imaging surface exceeds a defined tolerance distance where an image captured with the photo-detector array 102 is deemed acceptable). For instance, the lens may have at least one spherical aberration that exceeds a first tolerance from a defined spherical aberration, or the lens may have at least one cylindrical aberration that exceeds a first tolerance from a defined cylindrical aberration. Alternatively, the lens may have some combination of such defects. In one implementation, method step 302 includes the sub-step of capturing the primary image at a primary focal surface location of the lens (e.g., a defined focal surface of the lens where an image would form if the lens had no aberrations). In another implementation, method step 302 includes the sub-step of capturing the primary image with a photo-detector array at the primary focal surface location of the lens (e.g., positioning the lens such that a defined focal surface of the lens coincides with an imaging surface of a photo-detector array).

Referring again to FIG. 2, one specific example of method step 302 (FIG. 3) would be controller 208 directing lens system 200 to position lens 204 at a primary position, and thereafter instructing image capture unit 100 to capture an image from photo-detector 102.

With reference again to FIG. 3, method step 304 illustrates determining at least one out-of-focus region of the primary image (or determining at least one focused region of the primary image). In one implementation, method step 304 includes the sub-step of calculating a Fourier transform of at least a part of the primary image (e.g., sharp, or in-focus images produce abrupt transitions that often have significant high frequency components).

Referring again to FIG. 2, one specific example of method step 304 (FIG. 3) would be focus detection unit 210 performing a Fourier transform and subsequent analysis on at least a part of an image captured by image capture unit 206 when lens 204 was at the primary position. In this example, focus detection unit 210 could deem portions of the image having significant high frequency components as "in focus" images.

With reference again to FIG. 3, method step 306 shows capturing another image with the lens at another position. In one implementation, method step 306 includes the sub-step of capturing the other image at the primary focal surface location of the lens at the primary position (e.g., lens 204 is moved to another position, while photo-detector 102 remains stationary, such as shown and described in relation to FIGS. 4 and 5). In another implementation, the step of capturing the other image at a primary focal surface location of the lens at the primary position further includes the sub-step of moving at least a part of the lens to the other position; and capturing the other image with a photo-detector array at the primary focal surface location of the lens at the primary position. In another implementation, the step of moving at least a part of the lens to the other position further includes the sub-step of moving the at least a part of the lens to the other position within at least one distance constrained by the first tolerance from the target optical property. In another implementation, the step of moving at least a part of the lens to the other position further includes the sub-step of moving an intermediary lens. In another implementation, the step of moving at least a part of the lens to the other position further includes the sub-step of distorting the lens such that the at least a part of the lens resides at the other position (e.g., a part of lens 204 is moved to another position, such as might happen if lens 204 were to be compressed laterally in a controlled manner, while photo-detector 102 remains stationary, such as shown and described in relation to FIGS. 4 and 5).

Figure 4:
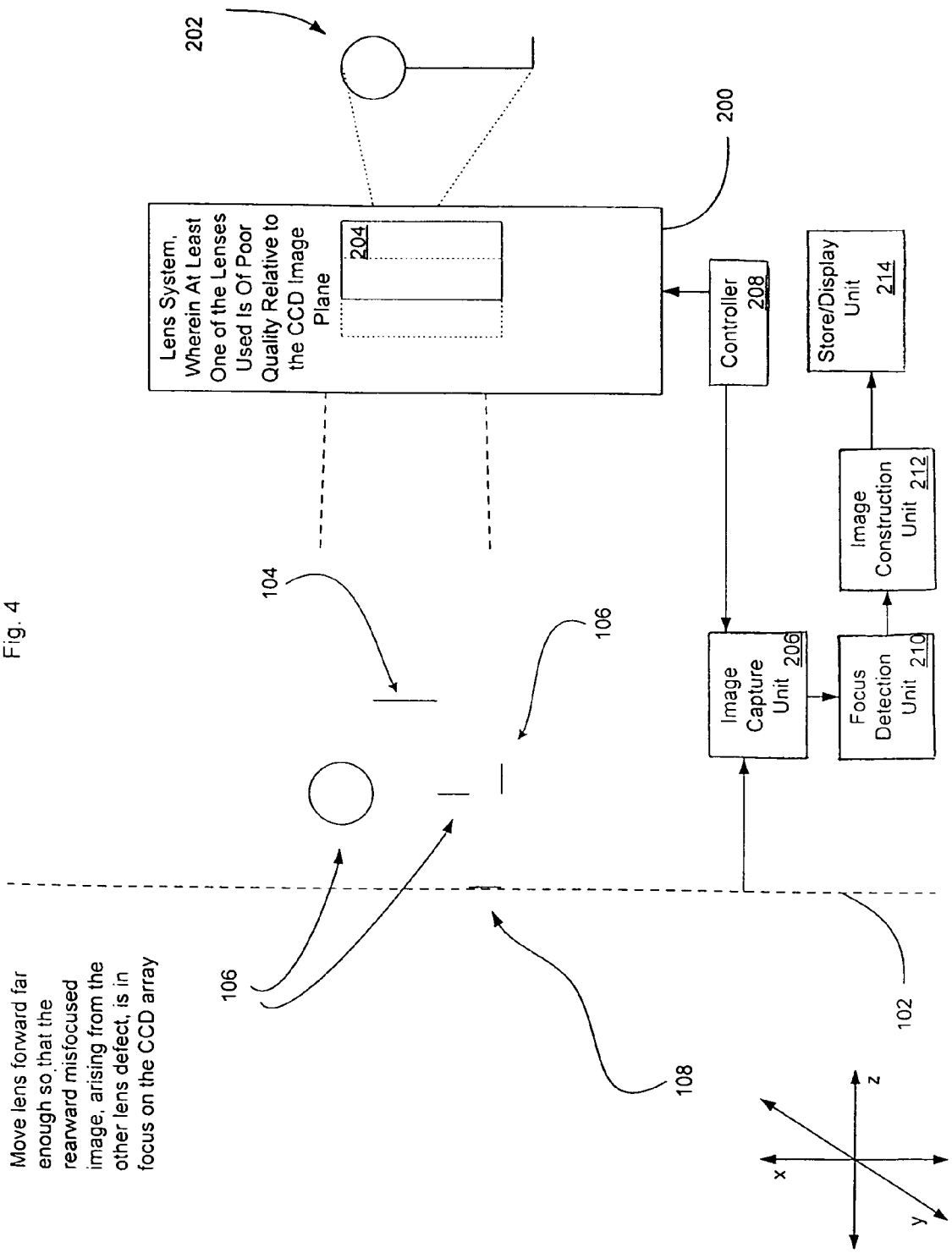
FIG. 4 depicts a side-plan view of the system of FIG. 2 wherein lens 204 has been moved in accordance with aspects of the process shown and described in relation to FIG. 3.
Figure 5:
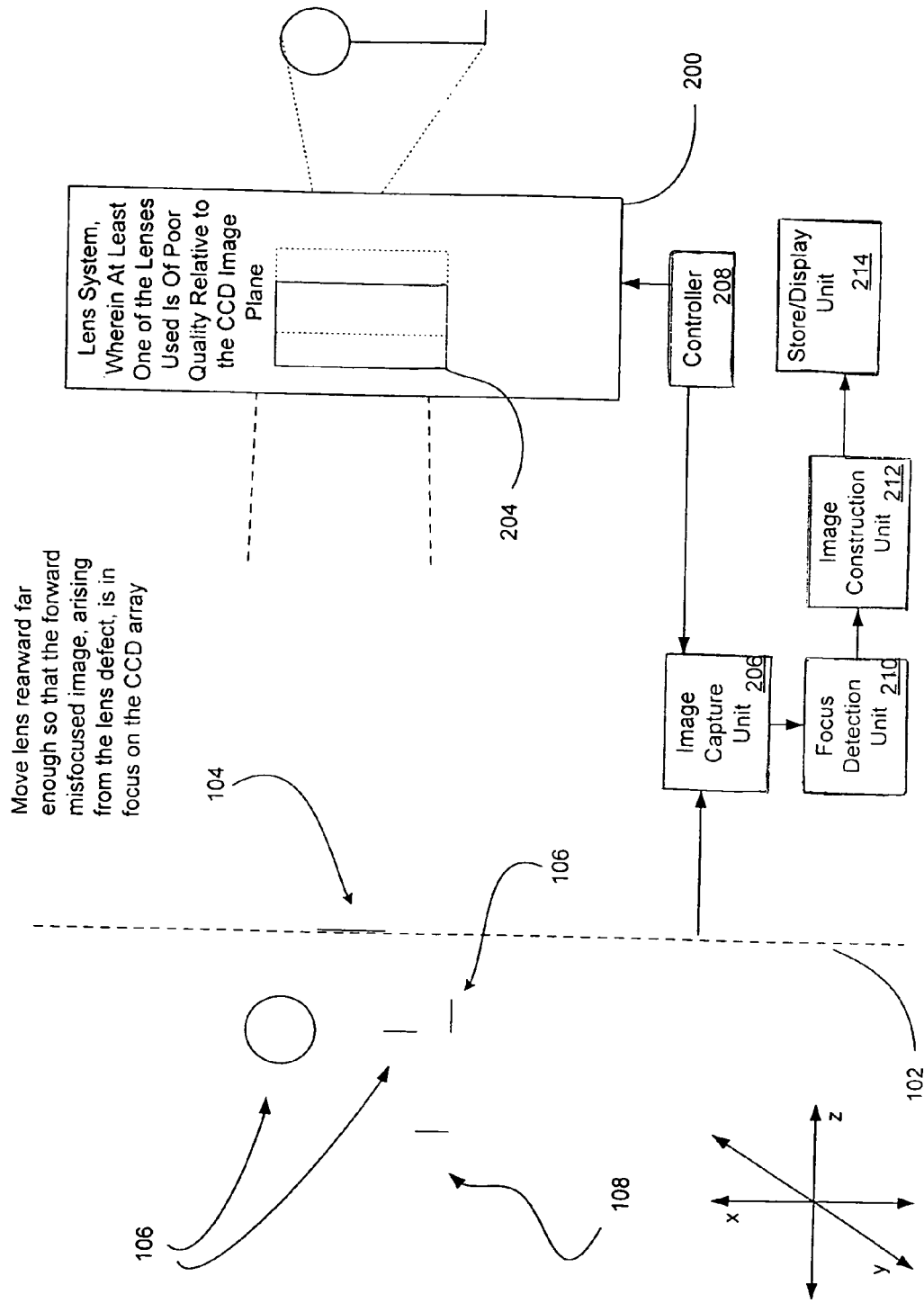
FIG. 5 illustrates another side-plan view of the system of FIG. 2 wherein lens 204 has been moved in accordance with aspects of the process shown and described in relation to FIG. 3.

Referring now to FIGS. 2, 4 and/or 5, one specific example of method step 306 (FIG. 3) would be controller 208 directing lens system 200 to position lens 204 at a position other than the primary position and thereafter instructing image capture unit 100 to capture an image from photo-detector 102. FIG. 4 shows and describes moving at least a portion of the lens forward of the primary position (e.g., such as by controller 208 moving lens 204 forward, or causing lens 204 to be compressed such that a part of lens 204 moves forward relative to an imaging surface of photo-detector 102). FIG. 5 shows and describes moving at least a portion of the lens rearward of the primary position (e.g., such as by controller 208 moving lens 204 forward, or causing lens 204 to be compressed such that a part of lens 204 moves rearward relative to an imaging surface of photo-detector 102).

With reference again to FIG. 3, method step 308 depicts determining a focus of at least one region of the other image relative to a focus of the at least one out-of-focus region of the primary image. In one implementation, method step 310 includes the sub-step of calculating a Fourier transform of at least a part of at least one region of the other image (e.g., sharp or in-focus images produce abrupt transitions that often have significant high frequency components). In one implementation, the step of calculating a Fourier transform of at least a part of at least one region of the other image (e.g., sharp or in-focus images produce abrupt transitions that often have significant high frequency components) includes the sub-step of mapping at least one region of the primary image with at least one region of the other image (e.g., mapping an out-of-focus region of the first image to a corresponding region of the second image).

Referring again to FIGS. 2, 4 and/or 5, one specific example of method step 302 (FIG. 3) would be focus detection unit 210 performing a Fourier transform and subsequent analysis on at least a part of an image captured by image capture unit 206 when lens 204 was at the other position specified by controller 208.

With reference again to FIG. 3, method step 310 depicts constructing a composite image in response to the at least one region of the other image having a sharper focus relative to the focus of the at least one out-of-focus region of the primary image. In one implementation, the step of constructing a composite image in response to the at least one region of the other image having a sharper focus relative to the focus of the at least one out-of-focus region of the primary image includes the sub-step of replacing at least a part of the out-of-focus region of the primary image with at least a part of the at least one region of the other image. In another implementation, the step of constructing a composite image in response to the at least one region of the other image having a sharper focus relative to the focus of the at least one out-of-focus region of the primary image includes the sub-step of replacing at least a part of the out-of-focus region of the primary image with at least a part of the at least one region of the other image. In yet another implementation, the step of constructing a composite image in response to the at least one region of the other image having a sharper focus relative to the focus of the at least one out-of-focus region of the primary image includes the sub-step of utilizing at least one of tiling image processing techniques, morphing image processing techniques, blending image processing techniques, and stitching image processing techniques.

In yet another implementation, the step of constructing a composite image in response to the at least one region of the other image having a sharper focus relative to the focus of the at least one out-of-focus region of the primary image includes the sub-steps of correlating a feature of the primary image with a feature of the other image; detecting at least one of size, color, and displacement distortion of at least one of the primary image and the other image; correcting the detected at least one of size, color, and displacement distortion of the at least one of the primary image and the other image; and assembling the composite using the corrected distortion. In yet another implementation, the step of constructing a composite image in response to the at least one region of the other image having a sharper focus relative to the focus of the at least one out-of-focus region of the primary image includes the sub-step of correcting for motion between the primary and the other image.

Referring again to FIGS. 2, 4 and/or 5, one specific example of method step 302 (FIG. 3) would be image construction unit 212 creating a composite image by replacing those portions of an image of person 202 captured at a primary position with more in-focus positions of an image of person 202 captured by image capture unit 206 when lens 204 was at the other position. In one implementation of the example, image construction unit 212 corrects for the motion between images using conventional techniques if such correction is desired. In another implementation of the example, motion correction is not used.

With reference again to FIG. 3, method step 312 shows a determination of whether an aggregate change in focus, relative to the primary position of method step 302, has exceeded a maximum expected deviation of a lens. For example, even with a relatively poor quality lens, there will typically be an upper manufacturing limit beyond which lens defects are not expected to go (e.g., the lens has manufacturing criteria such as a focal length of 5 mm+/−0.05 mm).

Referring again to FIGS. 2, 4 and/or 5, one specific example of method step 312 (FIG. 3) would be controller 208 comparing an aggregate movement in a defined direction against a pre-stored upper limit deviation value. In an implementation of the example illustrated in FIG. 4, if lens 204 has manufacturing criteria such as a focal length of 5 mm+/−0.05 mm, controller 208 will determine whether the total forward movement of the lens is greater than 0.05 mm relative to the primary position. In an implementation of the example illustrated in FIG. 5, if lens 204 has manufacturing criteria such as a focal length of 5 mm+/−0.05 mm, controller 208 will determine whether the total rearward movement of the lens is greater than 0.05 mm relative to the primary position.

With reference again to FIG. 3, if the inquiry of method step 312 yields a determination that the aggregate changes in focuses has met or exceeded the maximum expected deviation of the lens, the process proceeds to method step 314. Method step 314 illustrates that the current composite image (e.g., of method step 310) is stored and/or displayed. One specific example of method step 314 would be store/display unit 214 either storing or displaying the composite image.

Method step 316 shows the end of the process.

Returning to method step 312, shown is that in the event that the upper limit on lens tolerance has not been met or exceeded, the process proceeds to method step 306 and continues as described herein.

Referring now to FIG. 4, depicted is a side-plan view of the system of FIG. 2 wherein lens 204 has been moved in accordance with aspects of the process shown and described in relation to FIG. 3. Lens 204 of lens system 200 is illustrated as having been moved to another position forward of the primary position which gave rise to the five different portions of image 100 shown and described in relation to FIGS. 1 and 2. Specifically, lens 204 of lens system 200 is illustrated as repositioned such that fifth portion 108 of image 100 is right sized and focused on an imaging surface of photo-detector array 102 (e.g., as shown and described in relation to method step 306). In one implementation, fifth portion 108 of image 100 can be combined with previously captured in focus and right sized portions 106 (e.g., FIGS. 1 and 2) to create a composite image such that the defects associated with fifth portion 108 as shown and described in relation to FIGS. 1 and 2 are alleviated (e.g., as shown and described in relation to method step 310). The remaining components and control aspects of the various parts of FIG. 4 function as described elsewhere herein.

With reference now to FIG. 5, illustrated is another side-plan view of the system of FIG. 2 wherein lens 204 has been moved in accordance with aspects of the process shown and described in relation to FIG. 3. Lens 204 of lens system 200 is illustrated as having been moved to another position rearward of the primary position which gave rise to the five different portions of image 100 shown and described in relation to FIG. 1. Specifically, lens 204 of lens system 200 is illustrated as positioned such that first portion 104 of image 100 is right sized and focused on an imaging surface of photo-detector array 102 (e.g., as described in relation to method step 306). In one implementation, first portion 104 of image 100 can be combined with previously captured in focus and right sized portions 106, 108 (e.g., FIGS. 1, 2, and 4) to create a composite image such that the defects associated with first portion 104 as shown and described in relation to FIGS. 1 and 2 are alleviated (e.g., as shown and described in relation to method step 310). The remaining components and control aspects of the various parts of FIG. 5 function as described elsewhere herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs), Field Programmable Gate Arrays (FPGAs), or other integrated formats. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various embodiments described herein which can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

While particular embodiments of the present invention have been shown and described, it will be understood by those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A method comprising:
    capturing a primary image of a subject with a lens at a primary position, the lens having at least one deviation that exceeds a first tolerance for a target optical property;
    capturing another image of the subject with the lens at another position, wherein said capturing another image with the lens at another position further includes:
        moving at least a part of the lens to the other position within at least one distance constrained by the at least one deviation;
    determining at least one out-of-focus region of the primary image;
    determining a focus of at least one region of the other image relative to a focus of the at least one out-of-focus region of the primary image; and
    constructing a composite image in response to the at least one region of the other image having a sharper focus relative to the focus of the at least one out-of-focus region of the primary image.

2. The method of claim 1, wherein the lens having at least one deviation that exceeds a first tolerance from a target optical property further comprises:
    the lens having at least one focal length that exceeds a first tolerance from a defined focal length.

3. The method of claim 1, wherein the lens having at least one deviation that exceeds a first tolerance from a target optical property further comprises:
    the lens having at least one spherical aberration that exceeds a first tolerance from a defined spherical aberration.

4. The method of claim 1, wherein the lens having at least one deviation that exceeds a first tolerance from a target optical property further comprises:
    the lens having at least one cylindrical aberration that exceeds a first tolerance from a defined cylindrical aberration.

5. The method of claim 1, wherein said capturing a primary image with a lens at a primary position, the lens having at least one deviation that exceeds a first tolerance from a target optical property further comprises:
    capturing the primary image at a primary focal surface location of the lens.

6. The method of claim 5, wherein said capturing the primary image at a primary focal surface location of the lens further comprises:
    capturing the primary image with a photo-detector array at the primary focal surface location of the lens.

7. The method of claim 1, wherein said capturing another image with the lens at another position further comprises:
    capturing the other image at a primary focal surface location with the lens at the another position.

8. The method of claim 7, wherein said capturing the other image at a primary focal surface location with the lens at another position further comprises:
    capturing the other image with a photo-detector array at the primary focal surface location with the lens at the another position.

9. The method of claim 1, wherein said moving at least a part of the lens further comprises:
    moving an intermediary lens.

10. The method of claim 1, wherein said moving at least a part of the lens further comprises:
    distorting the lens such that the at least a part of the lens reside at the other position.

11. The method of claim 1, wherein said determining at least one out-of-focus region of the primary image further comprises:
    calculating a Fourier transform of at least a part of the primary image.

12. The method of claim 1, wherein said determining a focus of at least one region of the other image relative to a focus of the at least one out-of-focus region of the primary image further comprises:
    calculating a Fourier transform of at least a part of the at least one region of the other image.

13. The method of claim 12, wherein said calculating a Fourier transform of at least a part of the at least one region of the other image further comprises:
    mapping at least one region of the primary image with at least one region of the other image.

14. The method of claim 1, wherein said constructing a composite image in response to the at least one region of the other image having a sharper focus relative to the focus of the at least one out-of-focus region of the primary image further comprises:
    replacing at least a part of the out-of-focus region of the primary image with at least a part of the at least one region of the other image.

15. The method of claim 14, wherein said replacing at least a part of the out-of-focus region of the primary image with at least a part of the at least one region of the other image further comprises:
    utilizing at least one of tiling image processing techniques, morphing image processing techniques, blending image processing techniques, and stitching image processing techniques.

16. The method of claim 1, wherein said constructing a composite image in response to the at least one region of the other image having a sharper focus relative to the focus of the at least one out-of-focus region of the primary image further comprises:
    correlating a feature of the primary image with a feature of the other image;
    detecting at least one of size, color, and displacement distortion of at least one of the primary image and the other image;
    correcting the detected at least one of size, color, and displacement distortion of the at least one of the primary image and the other image; and assembling the composite image using the at least one of the primary image and the other image that has been distortion corrected.

17. The method of claim 1, wherein said constructing a composite image in response to the at least one region of the other image having a sharper focus relative to the focus of the at least one out-of-focus region of the primary image further comprises:
correcting for motion between the primary and the other image.

18. A system comprising:
a lens having at least one deviation that exceeds a first tolerance for a target optical property;
means for capturing a primary image of a subject with a lens at a primary position;
means for capturing another image of the subject with the lens at another position, said means for capturing another image with the lens at another position further includes:
means for moving at least a part of the lens to the other position within at least one distance constrained by the at least one deviation;
means for determining at least one out-of-focus region of the primary image;
means for determining a focus of at least one region of the other image relative to a focus of the at least one out-of-focus region of the primary image; and
means for constructing a composite image in response to the at least one region of the other image having a sharper focus relative to the focus of the at least one out-of-focus region of the primary image.

19. The system of claim 18, wherein said lens having at least one deviation that exceeds a first tolerance from a target optical property further comprises:
the lens having at least one focal length that exceeds a first tolerance from a defined focal length.

20. The system of claim 18, wherein said lens having at least one deviation that exceeds a first tolerance from a target optical property further comprises:
the lens having at least one spherical aberration that exceeds a first tolerance from a defined spherical aberration.

21. The system of claim 18, wherein said lens having at least one deviation that exceeds a first tolerance from a target optical property further comprises:
the lens having at least one cylindrical aberration that exceeds a first tolerance from a defined cylindrical aberration.

22. The system of claim 18, wherein said means for capturing a primary image with a lens at a primary position further comprises:
means for capturing the primary image at a primary focal surface location of the lens.

23. The system of claim 22, wherein said means for capturing the primary image at a primary focal surface location of the lens further comprises:
means for capturing the primary image with a photodetector array at the primary focal surface location of the lens.

24. The system of claim 18, wherein said means for capturing another image with the lens at another position further comprises:
means for capturing the other image at a primary focal surface location with the lens at the another position.

25. The system of claim 24, wherein said means for capturing the other image at a primary focal surface location with the lens at another position further comprises:
capturing the other image with a photodetector array at the primary focal surface location with the lens at the another position.

26. The system of claim 18, wherein said means for moving at least a part of the lens further comprises:
means for moving an intermediary lens.

27. The method of claim 18, wherein said means for moving at least a part of the lens further comprises:
means for distorting the lens such that the at least a part of the lens reside at the other position.

28. The system of claim 18, wherein said means for determining at least one out-of-focus region of the primary image further comprises:
means for calculating a Fourier transform of at least a part of the primary image.

29. The system of claim 18, wherein said means for determining a focus of at least one region of the other image relative to a focus of the at least one out-of-focus region of the primary image further comprises:
means for calculating a Fourier transform of at least a part of the at least one region of the other image.

30. The system of claim 29, wherein said means for calculating a Fourier transform of at least a part of the at least one region of the other image further comprises:
means for mapping at least one region of the primary image with at least one region of the other image.

31. The system of claim 18, wherein said means for constructing a composite image in response to the at least one region of the other image having a sharper focus relative to the focus of the at least one out-of-focus region of the primary image further comprises:
means for replacing at least a part of the out-of-focus region of the primary image with at least a part of the at least one region of the other image.

32. The system of claim 31, wherein said means for replacing at least a part of the out-of-focus region of the primary image with at least a part of the at least one region of the other image further comprises:
means for utilizing at least one of tiling image processing techniques, morphing image processing techniques, blending image processing techniques, and stitching image processing techniques.

33. The system of claim 18, wherein said means for constructing a composite image in response to the at least one region of the other image having a sharper focus relative to the focus of the at least one out-of-focus region of the primary image further comprises:
means for correlating a feature of the primary image with a feature of the other image;
means for detecting at least one of size, color, and displacement distortion of at least one of the primary image and the other image;
means for correcting the detected at least one of size, color, and displacement distortion of the at least one of the primary image and the other image; and
means for assembling the composite image using the at least one of the primary image and the other image that has been distortion corrected.

34. The system of claim 18, wherein said means for constructing a composite image in response to the at least one region of the other image having a sharper focus relative to the focus of the at least one out-of-focus region of the primary image further comprises:
means for correcting for motion between the primary and the other image.

* * * * *

UNITED STATES PATENT AND TRADEMARK OFFICE
CERTIFICATE OF CORRECTION

PATENT NO. : 7,231,097 B2
APPLICATION NO. : 10/738626
DATED : June 12, 2007
INVENTOR(S) : W. Daniel Hillis et al.

It is certified that error appears in the above-identified patent and that said Letters Patent is hereby corrected as shown below:

Column 9, line 46, in Claim 2, the part of the claim that reads "from a target" should read --for a target--;
Column 9, line 51, in Claim 3, the part of the claim that reads "from a target" should read --for a target--;
Column 9, line 57, in Claim 4, the part of the claim that reads "from a target" should read --for a target--;
Column 9, line 63, in Claim 5, the part of the claim that reads "primary image with a lens" should read --primary image of a subject with a lens--

Column 11, line 33, in Claim 19, the part of the claim that reads "from a target" should read --for a target--;
Column 11, line 38, in Claim 20, the part of the claim that reads "from a target" should read --for a target--;
Column 11, line 44, in Claim 21, the part of the claim that reads "from a target" should read --for a target--;
Column 11, line 50, in Claim 22, the part of the claim that reads "primary image with a lens" should read --primary image of a subject with a lens--

Signed and Sealed this

Second Day of October, 2007

JON W. DUDAS
*Director of the United States Patent and Trademark Office*